United States Patent
Lagnado et al.

(10) Patent No.: US 10,716,168 B2
(45) Date of Patent: Jul. 14, 2020

(54) DATA TRANSMISSIONS WITHOUT CONNECTIONS

(71) Applicant: HEWLETT-PACKARD DEVELOPMENT COMPANY, L.P., Houston, TX (US)

(72) Inventors: Isaac Lagnado, Houston, TX (US); Danny Meng, Houston, TX (US)

(73) Assignee: Hewlett-Packard Development Company, L.P., Spring, TX (US)

(*) Notice: Subject to any disclaimer, the term of this patent is extended or adjusted under 35 U.S.C. 154(b) by 10 days.

(21) Appl. No.: 15/748,097

(22) PCT Filed: Dec. 9, 2015

(86) PCT No.: PCT/US2015/064801
§ 371 (c)(1),
(2) Date: Jan. 26, 2018

(87) PCT Pub. No.: WO2017/099763
PCT Pub. Date: Jun. 15, 2017

(65) Prior Publication Data
US 2018/0220489 A1    Aug. 2, 2018

(51) Int. Cl.
| | | |
|---|---|---|
| H04W 92/10 | (2009.01) | |
| H04W 48/16 | (2009.01) | |
| H04W 74/08 | (2009.01) | |
| H04W 72/04 | (2009.01) | |
| H04W 12/06 | (2009.01) | |
| H04W 4/021 | (2018.01) | |

(52) U.S. Cl.
CPC ........... *H04W 92/10* (2013.01); *H04W 48/16* (2013.01); *H04W 72/0406* (2013.01); *H04W 74/0833* (2013.01); *H04W 4/022* (2013.01); *H04W 12/06* (2013.01)

(58) Field of Classification Search
CPC ............ H04W 92/10; H04W 72/0406; H04W 74/0833; H04W 48/16; H04W 4/022
See application file for complete search history.

(56) References Cited

U.S. PATENT DOCUMENTS

| | | | |
|---|---|---|---|
| 9,087,185 B2 | 7/2015 | Arashin et al. | |
| 9,409,903 B2 | 8/2016 | Tao et al. | |
| 9,544,713 B2 * | 1/2017 | Chen | G06F 1/3253 |
| 9,843,989 B2 * | 12/2017 | Lin | H04W 76/18 |
| 10,034,315 B2 * | 7/2018 | Jung | H04W 12/06 |
| 2006/0265479 A1 | 11/2006 | Runaker | |

(Continued)

OTHER PUBLICATIONS

"Android Phone Broadcast Packet While Not Connected to Any AP", http://stackoverflow.com/questions/12540007/androidphonebroadcastpacketwhilenotconnectedtoanyap, Sep. 22, 2012.

(Continued)

*Primary Examiner* — Min Jung
(74) *Attorney, Agent, or Firm* — HPI Patent Department

(57) ABSTRACT

An example system includes a transceiver. The system also includes a controller communicatively coupled to the transceiver. The controller is to detect an access point. The controller also is to determine the access point forwards data received from unconnected devices. The controller is to instruct the transceiver to transmit data to the access point without connecting to the access point.

15 Claims, 6 Drawing Sheets

(56) References Cited

U.S. PATENT DOCUMENTS

| | | | |
|---|---|---|---|
| 2008/0016556 A1* | 1/2008 | Selignan | H04W 4/90 |
| | | | 726/7 |
| 2008/0070563 A1* | 3/2008 | Adya | H04W 12/12 |
| | | | 455/422.1 |
| 2009/0094111 A1 | 4/2009 | Wu et al. | |
| 2009/0141707 A1 | 6/2009 | Kavanaugh | |
| 2009/0292710 A1 | 11/2009 | Casey | |
| 2013/0208694 A1 | 8/2013 | Park | |
| 2014/0010107 A1 | 1/2014 | Chikkappa et al. | |
| 2014/0181902 A1* | 6/2014 | Bone | H04L 63/0853 |
| | | | 726/3 |
| 2015/0133147 A1 | 5/2015 | Prechner | |
| 2018/0013798 A1* | 1/2018 | Pallas | H04L 63/205 |

OTHER PUBLICATIONS

Chandra, Ranveer et al., "Beacon-Stuffing: Wi-Fi Without Associations," Mobile Computing Systems and Applications, HotMobile 2007, Eighth IEEE Workshop, Mar. 8, 2007, 6 pgs.

\* cited by examiner

DATA TRANSMISSIONS WITHOUT CONNECTIONS

BACKGROUND

A device may communicate with a network wirelessly. For example, the network may include a plurality of access points, and the device may send data to and receive data from the access points to communicate with other devices in the network. As used herein, the term "access point" refers to a device that communicates data between a wireless device and a network. The access points may include Wi-Fi base stations, cellular base stations (e.g., evolved Node Bs), or the like. The network may include a local area network (LAN), a wide area network (WAN) (e.g., the Internet), or the like.

DETAILED DESCRIPTION

Figure 1:
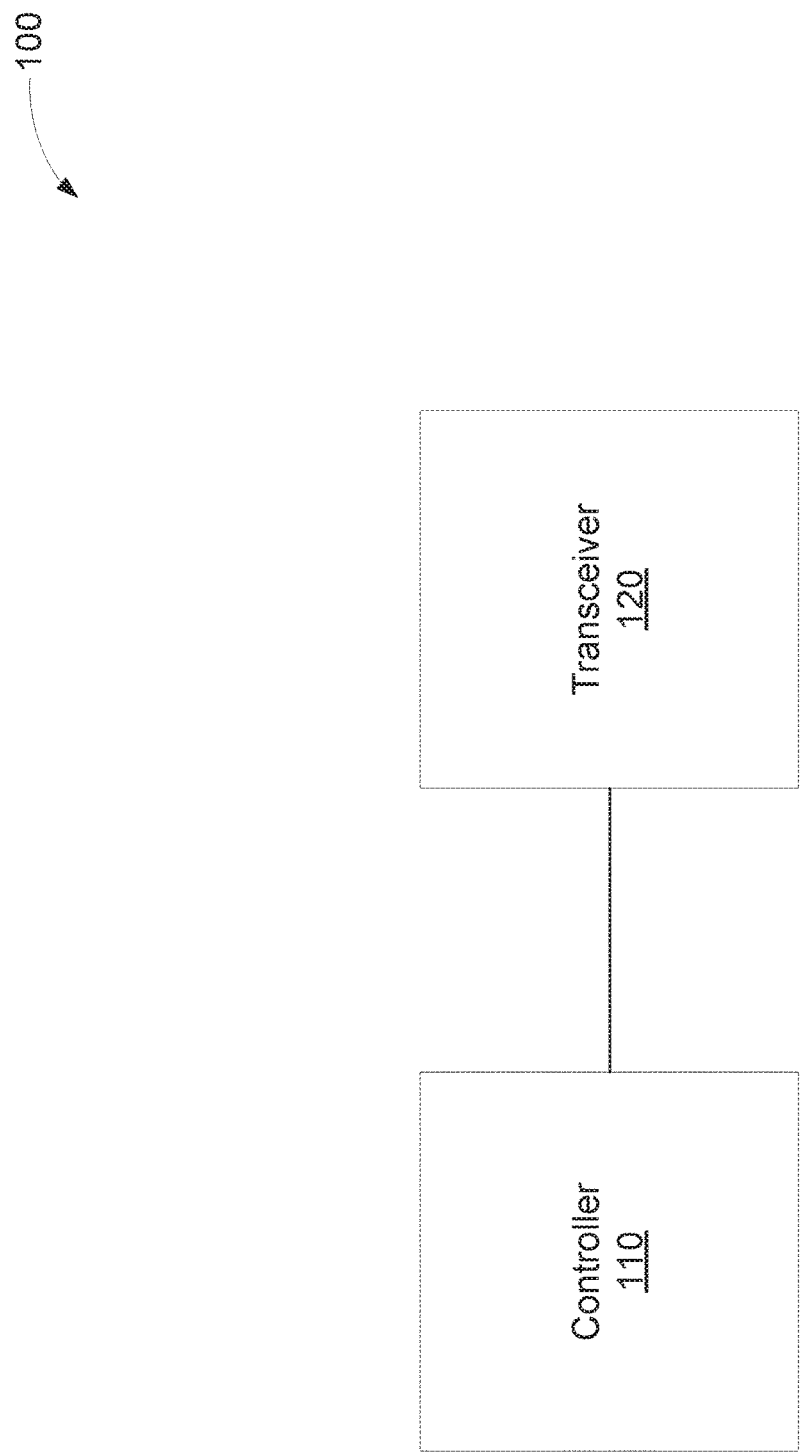
FIG. 1 is a block diagram of an example system to transmit data to an access point without connecting to the access point.

The device may connect to the access point before the access point transmits data from the device to destinations in the network. To connect to the access point, the device may initially discover nearby access points. For example, the device may transmit a probe request to all access points within range of the device. The access points may transmit probe responses identifying the access points and indicating capabilities. In an example, the device may authenticate with the access point. For example, the device may transmit an authentication request, and the access point may transmit an authentication response indicating whether the device authenticated successfully (e.g., an authentication request and response according to the Wired Equivalent Privacy (WEP) security protocol). In some examples, the authentication request may prove the device is in possession of a predetermined key. Alternatively, the access point may be open, and a key may not be needed to authenticate.

The device may associate with the access point. The device may transmit a request to associate with the access point, and the access point may transmit a response indicating whether the device associated successfully. The device and access point may authenticate each other once the device has been associated. In an example, the device and access point may perform a Wi-Fi Protected Access (WPA) or WPA2 security protocol to authenticate. As used herein, the term "connected" to an access point refers to having associated and authenticated successfully with the access point and not yet having disassociated or deauthenticated with the access point. The access point may assign an address to the device. For example, the access point may use a dynamic host configuration protocol (DHCP) to assign an address to the device. In some examples, a user of the device may interact with a captive portal before the access point provides the device with access (or full access) to the network. Once access is provided, the access point may transmit data from the device towards destinations in the network and transmit data from the network to the device.

Many access points restrict access by unauthorized or unknown devices. For example, the access point may restrict access to devices that have authenticated or for which a user has interacted with a captive portal. Accordingly, a device may be in the proximity of a plurality of unfamiliar access points and no familiar access points. The device may be unable to access the network because it does not have credentials for authenticating with the unfamiliar access points. Alternatively, or in addition, the device or an application on the device may wish to send data to the network without requiring user intervention. However, access points with captive portals may prevent the device from accessing the network without user intervention.

In an example, a device may attempt to transmit system information, such as status, management, health data, or the like, to a remote device periodically or aperiodically. For example, the device may be an enterprise device, and the system information may be transmitted to a server responsible for monitoring enterprise devices. The system information may be small relative to the bandwidth of the connection between an average access point and the network. The remote device may also send responsive data back to the device. For example, the server may notify the device if the device has been reported as stolen. The device may be unable to transmit the system information to the remote device or receive responses if it cannot authenticate with an access point or if it cannot obtain user intervention with a captive portal. The user may be unwilling to intervene with the captive portal if the device is stolen. The device could better report its system information if it could transmit data to the network without connecting to an access point.

FIG. 1 is a block diagram of an example system 100 to transmit data to an access point (not shown) without connecting to the access point. The system 100 may include a controller 110 and a transceiver 120 communicatively coupled to the controller 110. As used herein, the term "transceiver" refers to hardware (e.g., analog or digital circuitry) to modulate and demodulate electromagnetic waves. The transceiver may, but does not necessarily, include an antenna. As used herein, the term "controller" refers to hardware (e.g., a processor, such as an integrated circuit or other circuitry) or a combination of software (e.g., programming such as machine- or processor-executable instructions, commands, or code such as firmware, a device driver, programming, object code, etc.) and hardware. Hardware includes a hardware element with no software elements such as an application specific integrated circuit (ASIC), a Field Programmable Gate Array (FPGA), etc. A combination of hardware and software includes software hosted at hardware (e.g., a software module that is stored at a processor-readable memory such as random access memory (RAM), a hard-disk or solid-state drive, resistive memory, or optical media such as a digital versatile disc (DVD), and/or executed or interpreted by a processor), or hardware and software hosted at hardware.

The controller 110 may detect an access point. Detecting the access point may include identifying the access point based on received information. For example, the controller 110 may instruct the transceiver 120 to transmit a request for information, such as a probe request, to all nearby access points. The transceiver 120 may receive a response, such as a probe response, from the access point. The controller 110 may identify the access point based on the information contained in the response. Alternatively, or in addition, the transceiver 120 may receive a control frame, such as a beacon frame, from the access point. The controller 110 may identify the access point based on the information contained in the control frame.

The controller 110 may determine the access point forwards data received from unconnected devices. The information in the probe response or the control frame may indicate whether the access point forwards data received from unconnected devices. For example, the information may include an explicit indication that the access point forwards data received from unconnected devices. Alternatively, or in addition, the information may implicitly indicate that the access point forwards data received from unconnected devices, for example, by indicating requirements for data from unconnected devices (e.g., when it can be transmitted, how much can be transmitted, etc.).

The controller 110 may instruct the transceiver 120 to transmit data to the access point without connecting to the access point. For example, the controller 110 may not instruct the transceiver 120 to authenticate or associate with the access point (e.g., by sending an authentication request, sending an association request, performing a WPA2 security protocol, or the like). For example, the controller 110 may instruct the transceiver to neither associate nor authenticate, to associate but not authenticate, or the like. The controller 110 may instruct the transceiver 120 to transmit a data frame addressed to the access point and containing the data. In an example, the controller 110 may instruct the transceiver 120 to transmit the data to the access point without transmitting any prior frames other than to detect the access point. Alternatively, the controller 110 may instruct the transceiver 120 to initially transmit a request for permission to transmit the data (e.g., a request to send (RTS) frame) and may transmit the data based on receiving permission to do so. The controller 110 may comply with any requirements of the access point, such as a data size limit, when to transmit, or the like.

Figure 2:
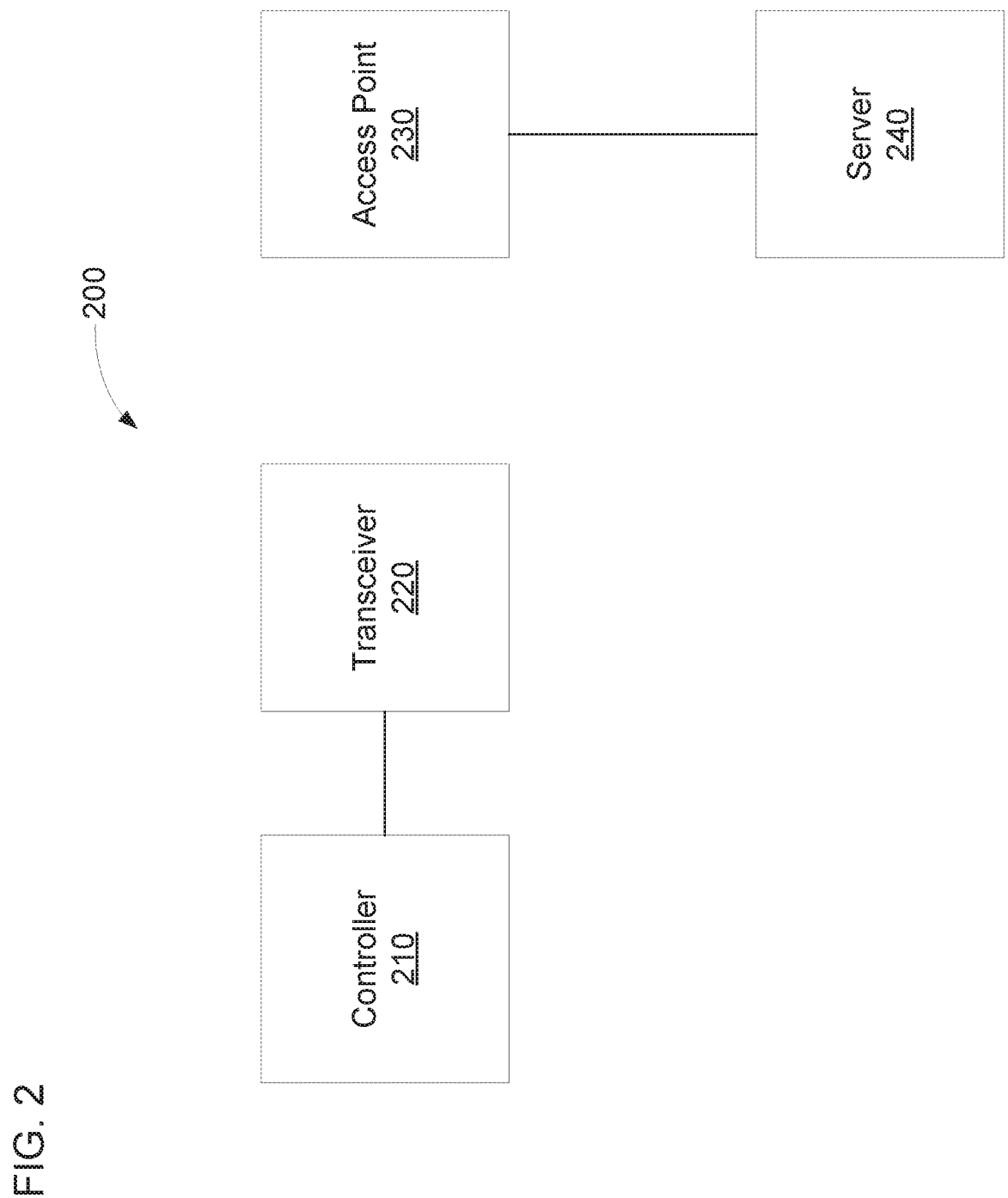
FIG. 2 is a block diagram of another example system to transmit data to an access point without connecting to the access point.

FIG. 2 is a block diagram of another example system 200 to transmit data to an access point 230 without connecting to the access point 230. The system 200 may include a controller 210 and a transceiver 220 communicatively coupled to the controller 210. The system 200 may be in the proximity of the access point 230, and the access point 230 may be connected to a server 240 via a network. In an example, the transceiver 220 and the access point 230 may communicate according to the Institute of Electrical and Electronics Engineers (IEEE) 802.11 standard (i.e., a Wi-Fi access point), and the network may be a WAN, such as the Internet. Alternatively, the access point 230 may be a cellular base station, such as an evolved Node B, or the network may be a LAN.

The controller 210 may decide to send data to the server 240. In an example, the data may be system information, such as status data, health data, management data, location data for the system 200, or the like. For example, the location data may include a location from a satellite navigation system, identities of nearby access points, or the like. In an example, the controller 210 may determine a predetermined time has passed since transmitting the system information to the server 240. For example, the controller 210 may periodically transmit the system information to the server 240, and the controller 210 may determine that a periodic transmission should be transmitted. Alternatively, or in addition, the controller 210 may transmit the system information to the server 240 in response to predetermined events. For example, the controller 210 may determine that a predetermined event has occurred and the system information should be transmitted to the server 240.

The controller 210 may detect the access point 230. For example, the controller 210 may instruct the transceiver 220 to transmit a probe request, and the transceiver 220 may receive a probe response identifying the access point 230. Alternatively, or in addition, the transceiver 220 may receive a beacon frame identifying the access point 230. The information identifying the access point 230 may indicate that the access point 230 requires a credential to connect to the access point 230. For example, the access point 230 may require a credential to authenticate according to the WEP protocol, the WPA protocol, the WPA2 protocol, or the like. The information identifying the access point 230 may indicate which form of authentication is required.

The controller 210 may determine the access point 230 forwards data received from unconnected devices. For example, the information identifying the access point 230 in the probe response or the beacon frame may indicate explicitly or implicitly that the access point 230 is capable of forwarding data received from unconnected devices. The access point 230 may forward the data without receiving a credential from the system 200. The access point 230 may restrict when data can be transmitted to the access point 230 from unconnected devices or how much data can be transmitted. The access point 230 may indicate when data can be transmitted by unconnected devices or a size limit for transmitted data. For example, the access point 230 may indicate a time slot for data frames from unconnected devices. By restricting when unconnected devices can transmit, the access point 230 may limit disruption of traffic from connected devices.

The controller 210 may instruct the transceiver 220 to transmit data to the access point 230 without connecting to the access point 230. The controller 210 may comply with any restrictions of the access point 230 for unconnected devices. For example, the data may be within the size limit specified by the access point 230, and the controller 210 may instruct the transceiver 220 to transmit the data in the time slot specified by the access point 230 for data from unconnected devices. The controller 210 may instruct the transceiver 220 to transmit the data to the access point 230 without first instructing the transceiver 220 to provide a credential to the access point 230. The system 200 may be neither authenticated nor associated with the access point 230 when the transceiver 220 transmits the data despite the access point 230 requiring authentication to connect to it. Alternatively, the system 200 may be associated but not authenticated with the access point 230 when the transceiver 220 transmits the data despite the access point 230 requiring authentication to connect to it. The data may include system information, and the controller 210 may set a destination address for the data to the server 240.

The access point 230 may receive the data from the transceiver 220. The access point 230 may determine whether the data is eligible for transmission to the server 240 without a connection from the system 200. For example, the access point 230 may determine whether the server 240 is an eligible destination. The access point 230 may maintain a list of eligible destinations. Alternatively, or in addition, the access point 230 may communicate with a remote system (not shown), such as a remote system connected to the network, and may receive an indication of whether the server 240 is an eligible destination. In an example, the access point 230 may communicate with the server 240 to determine whether the server 240 is an eligible destination.

In an example, the access point 230 may negotiate an agreement with the server 240 or negotiate for payment from the server 240. Alternatively, the access point 230 may have previously negotiated with the server 240. The agreement may cover a single access point or an entity that possesses a plurality of access points. The access point 230 may negotiate a monetary rate, a bandwidth, a transmission limit, or the like with the server 240. In an example, the server 240 may negotiate for different access or performance levels for different sets of devices. Similarly, in an example with multiple servers, each server may negotiate for a different access or performance level. The server 240 may negotiate changes to the agreement. For example, the server 240 may determine that an update to a basic input/output system (BIOS) or to software on a hard drive should occur, and the server 240 may negotiate a higher monetary rate and bandwidth or transmission limit (e.g., an extra $50 payment for an extra 80 gigabytes of transmissions over the next two-hour period).

The access point 230 and the server 240 may negotiate an agreement that treats data differently depending on the type of data. High priority data, such as an indication the system 200 is stolen, important security updates, etc., may be provided a higher priority by the access point 230. For example, the server 240 may provide a higher payment for the high priority data, and the access point 230 may determine the data is eligible even if it would not qualify as eligible if it were normal priority. In an example, the access point 230 and the server 240 may agree to a plurality of priority levels, and the system 200 or the server 240 may indicate the priority of transmitted data. The controller 210 may determine the priority of transmitted data based on the type of data to be transmitted, the time since last transmitting similar data, or the like.

In an example, the access point 230 may determine whether the received data is less than a predetermined size. If the data is larger than the predetermined size, the access point 230 may discard the data without transmitting it to the server 240. The access point 230 may notify the system 200 that the received data is over the size limit. If the data is less than the predetermined size, the access point 230 may determine the data is eligible for transmission. The predetermined size may vary depending on the destination, or there may be an absolute size limit. The size limit may be selected based on the type of data to be transmitted by the system 200 or may be defined in a standard.

The access point 230 may determine whether bandwidth is available for the data. The access point 230 may treat unconnected data as having a lowest priority, and any data from connected devices (not shown) may take precedence. Accordingly, if all available bandwidth is occupied by connected devices, the access point 230 may drop the unconnected data from the system 200 before dropping any data from the connected devices. The access point 230 may transmit an indication that the data was dropped to the transceiver 220. The access point 230 may transmit an indication to the transceiver 220 of when it should try again. In an example, the access point 230 may determine the size limit based on the amount of bandwidth occupied by connected devices. The size limit may be larger if more bandwidth is available and smaller if less bandwidth is available.

The access point 230 may determine whether a transmission limit has been exceeded. The transmission limit may be a transmission limit for each unconnected device, a transmission limit for each destination, an absolute transmission limit for all devices and destinations, or the like. The access point 230 may count the amount of data transmitted (e.g., count the data per device, the data per destination, the total data, etc.) and compare it to the transmission limit. The count of data transmitted may reset periodically, or old transmissions may age out of the count. The access point may adjust the transmission limit based on the amount of bandwidth being used by connected devices. The transmission limit may be larger if more bandwidth is available and smaller if less bandwidth is available. The access point 230 may drop the unconnected data if the transmission limit is exceeded. The access point 230 may transmit an indication that the data was dropped to the transceiver 220. The access point 230 may transmit an indication to the transceiver 220 of when it should try again. Alternatively, or in addition, the access point 230 may broadcast indications that it does not support transmission of unconnected data (e.g., in beacon frames, probe responses, etc.) when the transmission limit has been exceeded.

In an example, the access point 230 may inspect the data to ensure that it is not malicious. For example, the access point 230 may examine the data to determine whether it appears to be part of a denial-of-service attack (e.g., whether the data is malformed, whether the data is attempting to establish a protocol layer connection, etc.). Alternatively, or in addition, the access point 230 may perform a deep packet inspection to look for malicious content. In an example, the access point 230 may black list devices that transmit malicious data. The access point 230 may not transmit any data from black listed devices. The access point 230 may retrieve the black list from a remote location.

If the access point 230 determines the data from the system 200 is eligible for transmission, the access point 230 may transmit the data to the server 240. The controller 210 may include a destination address (e.g., an Internet Protocol (IP) address) in the data transmitted by the transceiver 220 to the access point 230. The access point 230 may route the data on the network based on the destination address, or the access point 230 may transmit the data to a router to route along the network based on the destination address. The server 240 may receive the data. In an example, the server 240 may transmit a response to the access point 230. The access point 230 may transmit the response to the transceiver 220. In an example, the access point 230 may indicate that it will be transmitting the response to the transceiver 220 (e.g., in a traffic indication map) before transmitting the response.

In an example, the controller 210 may instruct the transceiver 220 to receive transmissions from the access point 230, and the controller 210 may monitor the transmissions for a response. For example, the controller 210 may instruct the transceiver 220 to receive beacon frames from the access point 230, and the controller 210 may examine the traffic indication map to determine whether a response will be transmitted. The controller 210 or transceiver 220 may sleep between beacon frames to conserve power. The controller 210 may instruct the transceiver 220 to receive a predetermined number of beacon frames or receive beacon frames for a predetermined time to monitor for a response.

The controller 210 may perform an action based on the response. For example, a system configuration may be out of date, and the controller 210 may modify the configuration based on the response. In an example, the transceiver may receive a response indicating the system 200 has been stolen. The controller 210 may disable the system 200 so that it cannot be used based on receiving the response indicating the system 200 has been stolen. The system 200 may include sensitive information, so disabling the system 200 may include deleting data from the system 200. Thus, the system 200 may report system information to the server 240 and receive responses from the server 240 even if it is unable to connect to any nearby access points.

Figure 3:
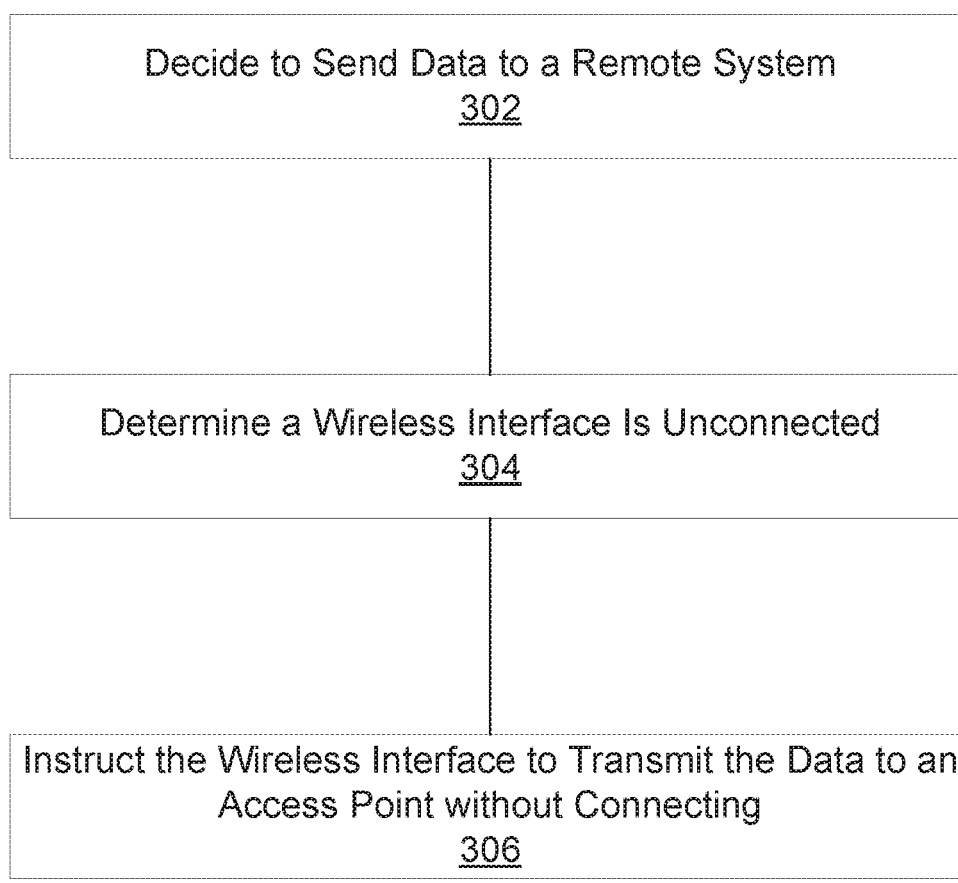
FIG. 3 is a flow diagram of an example method to transmit data to an access point without connecting to the access point.

FIG. 3 is a flow diagram of an example method 300 to transmit data to an access point without connecting to the access point. A processor may perform the method 300. At block 302, the method 300 may include deciding to send data to a remote system. For example, deciding to send data may include determining data has not been sent within a predetermined time. Alternatively, or in addition, deciding to send data may include determining an event has occurred and based on the event data should be sent. The data may include system information, such as status, health, or management data.

At block 304, the method 300 may include determining a wireless interface is unconnected. The wireless interface may be requested to indicate its status, and the wireless interface may indicate that it is unconnected. Alternatively, or in addition, the wireless interface may have previously indicated its status, which may have been stored. The previously indicated status may be retrieved to determine whether the wireless interface is unconnected. In an example, the wireless interface may automatically connect to access points if it is able. If the wireless interface is unconnected, it may imply that the wireless interface is unable to connect to an access point automatically.

Block 306 may include instructing the wireless interface to transmit the data to an access point without connecting to the access point. In an example, the wireless interface may determine if there is an access point in range that transmits data from unconnected wireless interfaces. If so, the wireless interface may transmit the data to that access point without connecting to it. Alternatively, or in addition, the wireless interface may have previously detected an access point that transmits data from unconnected wireless interfaces and previously indicated that access point did so. The wireless interface may be instructed to transmit the data to the previously indicated access point. Referring to FIG. 1, for example, blocks 302, 304, and 306 may be performed by the controller 110.

Figure 4:
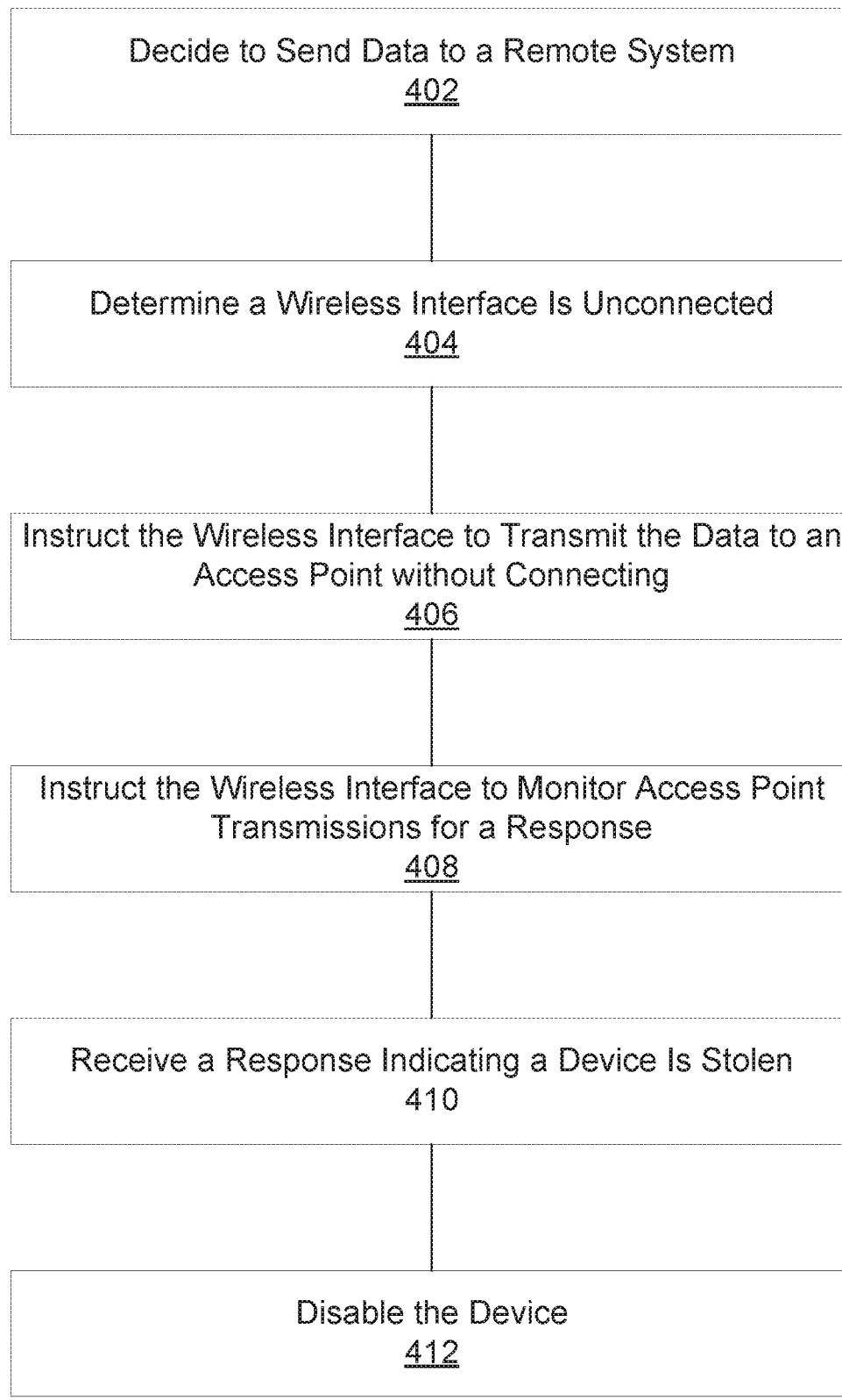
FIG. 4 is a flow diagram of another example method to transmit data to an access point without connecting to the access point.

FIG. 4 is a flow diagram of another example method 400 to transmit data to an access point without connecting to the access point. A processor may perform the method 400. At block 402, the method 400 may include deciding to send data to a remote system. For example, the remote system 400 may be a server that manages devices, and block 402 may include deciding to send updated system information for a device to the server. Block 404 may include determining a wireless interface is unconnected. It may be determined that the wireless interface is not associated and authenticated with any access points. The wireless interface may indicate that is not associated and authenticated by reporting that it is unconnected.

At block 406, the method 400 may include instructing the wireless interface to transmit the data to an access point without connecting to the access point. The wireless interface may be instructed to transmit the data to the access point without the wireless interface authenticating and associating with the access point. Alternatively, the wireless interface may be instructed to associate with the access point and to transmit the data to the access point without the wireless interface authenticating with the access point. In an example, the wireless interface may transmit a frame addressed to the access point without authenticating or associating with the access point. The frame may include an indication that it is from an unconnected device. Instructing the wireless interface to transmit the data may include instructing the wireless interface to transmit the data to a particular network layer destination address. For example, the network layer destination address may be of a system for managing devices. The wireless interface may comply with any restrictions from the access point on the size of the data transmitted or when the data is transmitted. In an example, the wireless interface may indicate the maximum size of data that can be transmitted. Instructing the wireless interface to transmit the data may include providing data within that maximum size to the wireless interface.

At block 408, the method 400 may include instructing the wireless interface to monitor access point transmissions for a response. The length of time to monitor may be indicated to the wireless interface. Alternatively, the wireless interface may monitor the access point as long as it is in range. The wireless interface may monitor the access point transmissions by monitoring beacon frames transmitted by the access point. The wireless interface may monitor a traffic indication map to determine whether or when the access point will transmit a response. The wireless interface may remain in a power-saving state between monitoring beacon frames. In an example, the wireless interface may be instructed not to monitor for a response if no response is expected.

Block 410 may include receiving a response indicating a device is stolen. In an example, the data transmitted by the wireless interface may include information identifying the device. The response may be from a system that manages the device. The system may indicate in the response that the device is stolen. For example, the device may have been reported as stolen to the system. Alternatively, or in addition, the response may indicate particular operations of the device should be restricted or that a configuration should be modified.

Block 412 may include disabling the device. The device may be disabled based on the response indicating the device is stolen. Disabling the device may include temporarily or permanently disabling the device. In an example, the device may store sensitive information in a persistent storage device. Disabling the device may include deleting data from the persistent storage device. For example, all data, user data, data marked as sensitive, or the like may be deleted from the persistent storage device. In an example, blocks 402-412 may be performed by the controller 210 of FIG. 2.

Figure 5:
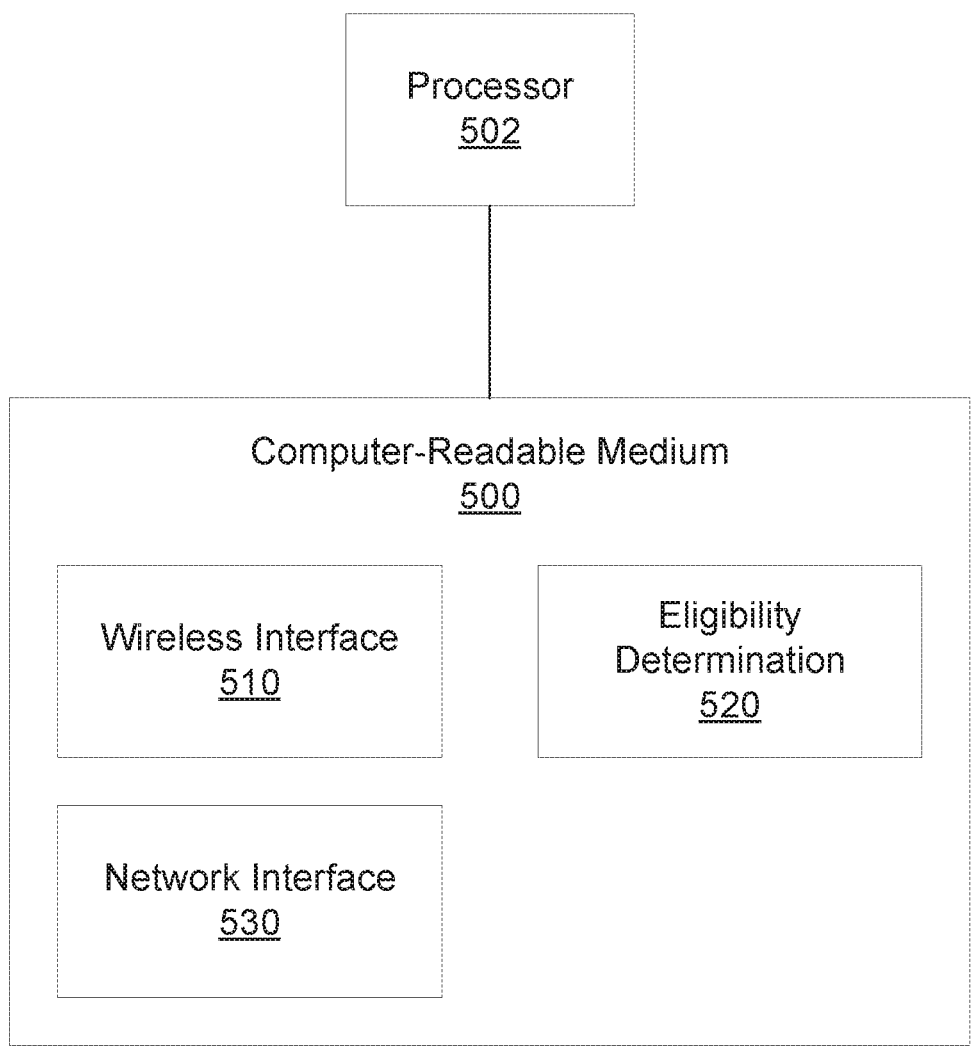
FIG. 5 is a block diagram of an example computer-readable medium including instructions that cause a processor to transmit data from an unconnected device.

FIG. 5 is a block diagram of an example computer-readable medium 500 including instructions that, when executed by a processor 502, cause the processor 502 to transmit data from an unconnected device. The computer-readable medium 500 may be a non-transitory computer readable medium, such as a volatile computer readable medium (e.g., volatile RAM, a processor cache, a processor register, etc.), a non-volatile computer readable medium (e.g., a magnetic storage device, an optical storage device, a paper storage device, flash memory, read-only memory, non-volatile RAM, etc.), and/or the like. The processor 502 may be a general purpose processor or special purpose logic, such as a microprocessor, a digital signal processor, a microcontroller, an ASIC, an FPGA, a programmable array logic (PAL), a programmable logic array (PLA), a programmable logic device (PLD), etc.

The computer-readable medium 500 may include a wireless interface module 510. As used herein, a "module" (in some examples referred to as a "software module") is a set of instructions that when executed or interpreted by a processor or stored at a processor-readable medium realizes a component or performs a method. The wireless interface module 510 may include instructions that cause the processor 502 to receive a wireless request from an unconnected device to transmit data to a destination. For example, the wireless interface module 510 may cause the processor 502 to receive a frame of data that includes a data link layer address for the wireless interface module 510. The data may include a network layer destination address indicating that the data should be transmitted to the destination. Receipt of the frame of data may implicitly indicate that the transmitter is requesting transmission of the data to the destination.

The computer-readable medium 500 may include an eligibility determination module 520. The eligibility determination module 520 may cause the processor 502 to determine whether the data is eligible for transmission without a connection from the unconnected device. In an example, the eligibility determination module 520 may cause the processor 502 to analyze predetermined criteria to decide whether the data is eligible for transmission without a connection from the unconnected device. The eligibility determination module 520 may cause the processor 502 to analyze the unconnected device, the received data, the destination, the data traffic from connected devices or other unconnected devices, or the like to determine whether the data is eligible for transmission without a connection from the unconnected device.

The computer-readable medium 500 may include a network interface module 530. The network interface module 530 may cause the processor 502 to transmit the data to the destination based on determining the data is eligible. The network interface module 530 may cause the processor 502 to transmit the data directly or indirectly to the destination. For example, the network interface module 530 may cause the processor 502 to route the data based on the network layer destination address, or the network interface module 530 may cause the processor 502 to transmit the data to a router to forward towards the destination. The network interface module 530 may cause the processor 502 to discard data that is determined to be ineligible. Referring to FIG. 2, the wireless interface module 510, the eligibility determination module 520, or the network interface module 530, when executed by the processor 502, may realize the access point 230, for example.

Figure 6:
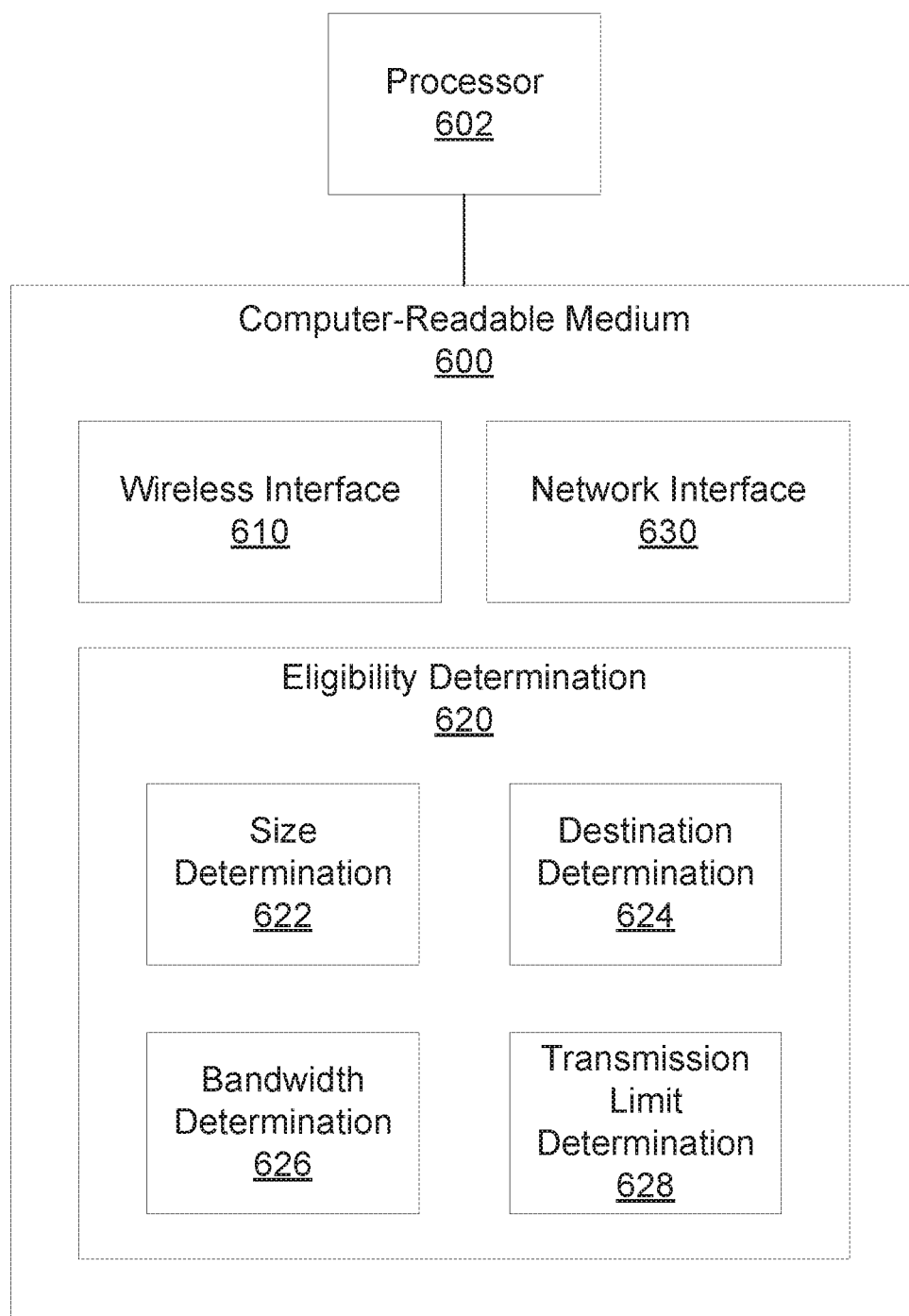
FIG. 6 is a block diagram of another example computer-readable medium including instructions that cause a processor to transmit data from an unconnected device.

FIG. 6 is a block diagram of another example computer-readable medium 600 including instructions that, when executed by a processor 602, cause the processor 602 to transmit data from an unconnected device. The computer-readable medium 600 may include a wireless interface module 610. In an example, the wireless interface module 610 may cause the processor 602 to communicate according to a Wi-Fi protocol. The wireless interface module 610 may cause the processor 602 to receive a wireless request from an unconnected device to transmit data to a destination. In an example, the wireless interface module 610 may have previously caused the processor 602 to transmit an indication that data from unconnected devices would be transmitted to a network, such as the Internet. For example, the wireless interface module 610 may have caused the processor 602 to transmit a beacon frame or a probe response indicating that data from unconnected devices would be transmitted to the network.

The computer-readable medium 600 may include an eligibility determination module 620. The eligibility determination module 620 may cause the processor 602 to determine whether the data is eligible for transmission to the destination without a connection from the unconnected device. The eligibility determination module 620 may include a size determination module 622, a destination determination module 624, a bandwidth determination module 626, and a transmission limit determination module 628. The size determination module 622 may cause the processor 602 to determine whether the data received from the unconnected device is less than (e.g., strictly less than, less than or equal to, etc.) a predetermined size. If the data is greater than the predetermined size, the size determination module 622 may cause the processor 602 to determine the data is ineligible and discard the data.

The destination determination module 624 may cause the processor 602 to determine whether the destination is an eligible destination. The destination determination module 624 may cause the processor 602 to determine whether the destination is eligible based on a network layer destination address in the data from the unconnected device. In an example, the destination determination module 624 may cause the processor 602 to determine whether the network layer destination address is on a white list or determine whether the network layer destination address is associated with a destination on a white list. The white list may be stored in the computer-readable medium 600 or stored remotely. Alternatively, or in addition, the destination determination module 624 may cause the processor 602 to consult a black list, or ranges of addresses or specific geographic regions may be allowed or disallowed.

The destination determination module 624 may cause the processor 602 to negotiate with a remote system to transmit data from unconnected devices associated with the remote system. The destination determination module 624 may cause the processor 602 to receive a request from the remote system to transmit data from devices associated with the remote system (e.g., to the remote system or to an associated system). In an example, the request may specify eligibility rules (e.g., data size, allowed destinations, bandwidth limits, transmission limits, etc.) and may specify a monetary rate for transmissions. There may be different sets of eligibility rules for different classes or priorities of data. The destination determination module 624 may cause the processor 602 to accept the request, transmit a counteroffer, reject the request, or the like. If the request is accepted or a counteroffer is accepted, the destination determination module 624 may cause the processor 602 to update eligibility rules based on the agreement.

The bandwidth determination module 626 may cause the processor 602 to determine whether bandwidth is available for the data. In an example, the bandwidth determination module 626 may cause the processor 602 to apply a traffic filter to outgoing data transmitted to the network. The traffic filter may treat the data from the unconnected device as having a lowest priority, so the data from the unconnected device may be the first to be dropped if there is insufficient bandwidth. The bandwidth determination module 626 may cause the processor 602 to prevent any reduction to the bandwidth available to connected devices, may allow a minor reduction, or the like. Alternatively, or in addition, the bandwidth determination module 626 may cause the processor 602 to analyze recent bandwidth usage by connected devices to determine whether there is bandwidth available for the data. The bandwidth determination module 626 may cause the processor 602 to analyze downstream bandwidth for data coming from the network to determine whether a response to the data will cause a reduction in the downstream bandwidth available to connected devices. In an example, the bandwidth determination module 626 may cause the processor 602 to broadcast an indication that data from unconnected devices will not be transmitted if it is determined that bandwidth is not available to prevent additional requests from unconnected devices.

The transmission limit determination module 628 may cause the processor 602 to determine whether a transmission limit has been exceeded. For example, the transmission limit determination module 628 may cause the processor 602 to limit how much data unconnected devices are permitted to transmit in total, per source device, per destination, or the like. The transmission limit determination module 628 may cause the processor 602 to compute how much data has been transmitted (e.g., in total, per source device, per destination, etc.) and compare the computed amount to the corresponding transmission limit. The transmission limit determination module 628 may cause the processor 602 to discard the data if a transmission limit is exceeded. The transmission limit determination module 628 may cause the processor 602 to use a window to determine how much data has been transmitted (e.g., in total, per source device, per destination, etc.) or to periodically reset the count of how much data has been transmitted.

In an example, the eligibility determination module 620 may cause the processor 602 to transmit an indication to the unconnected device if data was discarded or ineligible. The eligibility determination module 620 may cause the processor 602 to transmit an indication to the unconnected device of why the data was ineligible or when the unconnected device will be able to transmit data. Alternatively, the eligibility determination module 620 may not cause the processor 602 to transmit an indication to the unconnected device if data was discarded or ineligible. If the data is eligible, the network interface 630 may transmit the data to the destination. For example, the network interface 630 may transmit the data to the network for routing to the destination. In an example, the wireless interface module 610, the eligibility determination module 620, the size determination module 622, the destination determination module 624, the bandwidth determination module 626, the transmission limit determination module 628, or the network interface module 630, when executed by the processor 602, may realize the access point 230 of FIG. 2.

The above description is illustrative of various principles and implementations of the present disclosure. Numerous variations and modifications will become apparent to those skilled in the art once the above disclosure is fully appreciated. Accordingly, the scope of the present application should be determined only by the following claims.

What is claimed is:

1. A device, comprising:
a transceiver; and
a controller communicatively coupled to the transceiver, wherein the controller:
  detects an access point;
  determines that the access point is capable of forwarding, to a remote device, data received from unauthenticated devices; and
  instructs the transceiver to transmit data to the access point without authenticating to the access point,
wherein the access point indicates a time slot for receiving data from unauthenticated devices, and wherein the controller instructs the transceiver to transmit the data in the time slot.

2. The device of claim 1, wherein the data indicates a location of the device.

3. The device of claim 1, wherein the controller determines a predetermined time has passed since transmitting system information to a server, wherein the transmitted data includes the system information, and wherein a destination address of the transmitted data includes an address of the server.

4. The device of claim 1, wherein the access point requires a credential to authenticate to the access point, and wherein the controller instructs the transceiver to transmit the data to the access point without providing the credential.

5. The device of claim 1, wherein the controller:
receives a response from the access point indicating the device is stolen; and
disables the device based on the response indicating the device is stolen.

6. A method, comprising:
initiating, using a processor of a device, a request to transmit data from the device to an access point which communicates with a remote system;
determining, using the processor, that a wireless interface of the device is unauthenticated with the access point;
instructing, using the processor, the wireless interface to transmit the data from the device to the access point without authenticating the wireless interface to the access point;
receiving a response from the access point indicating the device is stolen; and
disabling the device based on the response indicating the device is stolen.

7. The method of claim 6, further comprising instructing the wireless interface to monitor transmissions from the access point for a response indicating that the access point forwards, to the remote system, data received from unauthenticated devices.

8. The method of claim 7, wherein instructing the wireless interface to monitor the transmissions from the access point comprises instructing the wireless interface to monitor the transmissions for a predetermined time.

9. The method of claim 6, wherein disabling the device comprises deleting data from persistent storage in the device.

10. A non-transitory computer-readable medium comprising instructions that, when executed by a processor for an access point, cause the processor to:
receive a wireless request from a device to transmit data to a destination with which the access point communicates, wherein the device is unauthenticated to the access point;
determine whether the data is eligible for transmission to the destination without authentication of the device to the access point; and
transmit the data to the destination via the access point based on determining the data is eligible,
wherein the instructions that cause the processor to transmit the data to the destination include instructions that cause the processor to periodically transmit system information to the destination, determine that a predetermined time has passed since transmitting the system information to the destination, and determine that a periodic transmission of the system information should be transmitted to the destination.

11. The computer-readable medium of claim 10, wherein the instructions that cause the processor to determine whether the data is eligible for transmission include instructions that cause the processor to determine whether the data is less than a predetermined size.

12. The computer-readable medium of claim 10, wherein the instructions that cause the processor to determine whether the data is eligible for transmission include instructions that cause the processor to negotiate an agreement with a remote system to transmit data from unauthenticated devices.

13. The computer-readable medium of claim 10, wherein the instructions that cause the processor to determine whether the data is eligible for transmission include instructions that cause the processor to determine whether bandwidth is available for the data.

14. The computer-readable medium of claim 10, wherein the instructions that cause the processor to determine whether the data is eligible for transmission include instructions that cause the processor to determine whether a transmission limit has been exceeded.

15. The computer-readable medium of claim 10, wherein the instructions further cause the processor to:
- receive a response from the access point indicating the device is stolen; and
- disable the device based on the response indicating the device is stolen.

\* \* \* \* \*